United States Patent
Sasai et al.

(10) Patent No.: US 11,716,149 B2
(45) Date of Patent: Aug. 1, 2023

(54) OPTICAL RECEIVING APPARATUS AND COEFFICIENT OPTIMIZATION METHOD

(71) Applicant: NIPPON TELEGRAPH AND TELEPHONE CORPORATION, Tokyo (JP)

(72) Inventors: Takeo Sasai, Musashino (JP); Fukutaro Hamaoka, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/435,105

(22) PCT Filed: Mar. 2, 2020

(86) PCT No.: PCT/JP2020/008631
§ 371 (c)(1),
(2) Date: Aug. 31, 2021

(87) PCT Pub. No.: WO2020/179726
PCT Pub. Date: Sep. 10, 2020

(65) Prior Publication Data
US 2022/0131619 A1    Apr. 28, 2022

(30) Foreign Application Priority Data
Mar. 5, 2019 (JP) .................................. 2019-039886

(51) Int. Cl.
*H04B 10/06* (2006.01)
*H04B 10/61* (2013.01)

(52) U.S. Cl.
CPC .............................. *H04B 10/6163* (2013.01)

(58) Field of Classification Search
CPC ............ H04B 10/6163; H04B 10/6161; H04B 10/6162; H04B 10/616; H04B 10/6164;
(Continued)

(56) References Cited

U.S. PATENT DOCUMENTS

2009/0226165 A1    9/2009  Tanaka et al.
2014/0286642 A1*   9/2014  Lowery ................ H04B 10/616
                                                   398/115
(Continued)

FOREIGN PATENT DOCUMENTS

JP      2009213069 A      9/2009
JP      2010268404 A      11/2010
WO      WO-2014167897 A1  10/2014

OTHER PUBLICATIONS

Abdelkerim Amari et al., A survey on fiber nonlinearity compensation for 400 Gbps and beyond optical communication systems, IEEE Communications Surveys and Tutorials, vol. 19, No. 4, 2017.
(Continued)

*Primary Examiner* — Hanh Phan
(74) *Attorney, Agent, or Firm* — Harness, Dickey & Pierce, P.L.C.

(57) ABSTRACT

An optical reception device includes a nonlinear optical compensation section which performs compensation of wavelength dispersion of a received signal obtained by receiving an optical signal according to a coherent detection method and compensation of a nonlinear optical effect of the received signal N (N is an integer of at least 1) step(s), and a coefficient update section which updates a coefficient so as to optimize the coefficient used in each step of the nonlinear optical compensation section based on a signal having been subjected to the compensation by the nonlinear optical compensation section and a predetermined training signal.

10 Claims, 7 Drawing Sheets

(58) Field of Classification Search
CPC ............... H04B 10/6165; H04B 10/40; H04B 10/2507; H04B 10/6971; H04B 10/6972; H04B 10/25137
USPC ....... 398/202, 208, 209, 204, 206, 207, 135, 398/136, 158, 159, 147, 81, 79, 33, 38, 398/25, 26, 27, 205
See application file for complete search history.

(56) References Cited

U.S. PATENT DOCUMENTS

| | | | |
|---|---|---|---|
| 2016/0036554 A1* | 2/2016 | Yasuda | H04J 14/06 398/65 |
| 2016/0094292 A1* | 3/2016 | Mochizuki | H04B 10/6165 398/208 |
| 2017/0237498 A1* | 8/2017 | Essiambre | H04B 10/614 398/136 |

OTHER PUBLICATIONS

Xiaoxu Li et al., Electronic post-compensation of WDM transmission impairments using coherent detection and digital signal processing, Optics Express, vol. 16, No. 2, 2008, pp. 880-888.

* cited by examiner

OPTICAL RECEIVING APPARATUS AND COEFFICIENT OPTIMIZATION METHOD

CROSS-REFERENCE TO RELATED APPLICATIONS

This application is a 371 U.S. National Phase of International Application No. PCT/JP2020/008631 filed on Mar. 2, 2020, which claims priority to Japanese Application No. 2019-039886 filed on Mar. 5, 2019. The entire disclosures of the above applications are incorporated herein by reference.

TECHNICAL FIELD

The present invention relates to an optical reception device and a coefficient optimization method.

BACKGROUND ART

In optical communication, it is known that, in the process of propagation of an optical signal in an optical fiber, distortion is generated in the waveform of the optical signal due to a nonlinear optical effect of the optical fiber. The nonlinear optical effect is a phenomenon in which phase rotation of the waveform is caused by inputting a high-power signal waveform into the optical fiber, and an influence of the nonlinear optical effect is greater as the optical fiber is longer.

In recent coherent optical communication, to cope with a significant increase in the capacity of an optical transmission system, a digital signal processing method for compensating for the nonlinear optical effect in the optical fiber is examined (see, e.g., NPL 1).

As a conventional method for compensating for waveform distortion in the optical communication, as shown in FIG. 7, there is proposed digital back propagation (DBP) in which the compensation of the nonlinear optical effect is performed in a time domain by perform a fast Fourier transform (hereinafter referred to as "FFT"), then performing wavelength dispersion compensation in a frequency domain, and then performing an inverse fast Fourier transform (hereinafter referred to as "IFFT") (see, e.g., NPL 2).

CITATION LIST

Non Patent Literature

[NPL 1] Abdelkerim Amari, Octavia A. Dobre, Ramachandran Venkatesan, O. S. Sunish Kumar, Philippe Ciblat, and Yves Jaouen, "A survey on fiber nonlinearity compensation for 400 Gbps and beyond optical communication systems", IEEE Communications Surveys and Tutorials, 2017.

[NPL 2] Xiaoxu Li, Xin Chen, Gilad Goldfarb, Eduardo Mateo, Inwoong Kim, Fatih Yaman, Guifang Li, "Electronic post-compensation of WDM transmission impairments using coherent detection and digital signal processing", OPTICS EXPRESS, Vol. 16, No. 2, 2008.

SUMMARY OF THE INVENTION

Technical Problem

The conventional digital back propagation is configured such that a set of a linear compensation section which performs the FFT, the wavelength dispersion compensation, and the IFFT and a nonlinear compensation section which performs the compensation of the nonlinear optical effect in the time domain is executed N (N is an integer of at least 1) step(s). Each of the linear compensation section and the nonlinear compensation section compensates for a signal by using a fixed coefficient. For example, in the case of the typical digital back propagation, the linear compensation section performs the compensation with the FFT/IFFT (multiplication of W) and a dispersion compensation section (multiplication of a dispersion compensation coefficient H), and the nonlinear compensation section performs the compensation by using a function of Formula (1). Note that Formula (1) indicates the function used by the nonlinear compensation section in the k (k≤N)-th step.

[Math. 1]

$$f(x)=xe^{-j\gamma_k\delta|x|^2} \quad \gamma \text{ and } \delta z \text{ are fixed real coefficients} \quad (1)$$

In the digital back propagation, compensation accuracy is higher as the number of times of the compensation described above is larger. However, when the number of times of the above compensation is increased, a plurality of FFT and IFFT circuits are required, and hence a circuit scale is increased to perform the compensation of the waveform distortion having high accuracy. On the other hand, when the number of steps N is reduced to limit the amount of arithmetic calculation to the amount of arithmetic calculation which can be practically implemented, a problem arises in that an actual physical phenomenon cannot be expressed and the compensation effect is limited.

In view of the above circumstances, an object of the present invention is to provide a technique capable of performing compensation of waveform distortion having high accuracy while limiting a circuit scale.

Means for Solving the Problem

An aspect of the present invention is an optical reception device including: a nonlinear optical compensation section which performs compensation of wavelength dispersion of a received signal obtained by receiving an optical signal according to a coherent detection method and compensation of a nonlinear optical effect of the received signal N (N is an integer of at least 1) step(s); and a coefficient update section which updates a coefficient so as to optimize the coefficient used in each step of the nonlinear optical compensation section based on a signal having been subjected to the compensation by the nonlinear optical compensation section and a predetermined training signal.

An aspect of the present invention is the optical reception device described above, wherein the coefficient used in each step of the nonlinear optical compensation section has a degree of freedom in each of a phase direction and a strength direction, and the coefficient update section optimizes coefficients in the phase direction and the strength direction.

An aspect of the present invention is the optical reception device described above, wherein the nonlinear optical compensation section is configured to include, in each step, a Fourier transform section which transforms the received signal in a time domain from the received signal in the time domain into a received signal in a frequency domain; a wavelength dispersion compensation section which performs the wavelength dispersion compensation of the received signal in the frequency domain; an inverse Fourier transform section which transforms the received signal having been subjected to the wavelength dispersion compensation into a received signal in the time domain; and a nonlinear compensation section which performs the compensation of the nonlinear optical effect of the received signal in the time domain output from the inverse Fourier transform section, and the coefficient update section optimizes coefficients in the phase direction and the strength direction of each of a coefficient used in the Fourier transform section or the inverse Fourier transform section, a coefficient used in the wavelength dispersion compensation section, and a coefficient used in the nonlinear compensation section.

An aspect of the present invention is the optical reception device described above, further including: a demodulation section which demodulates the received signal, wherein the coefficient update section creates an evaluation function by comparing a demodulation signal which is demodulated by the demodulation section with a transmission signal which is transmitted as a training signal by an optical transmitter, and updates the coefficient so as to minimize the evaluation function.

An aspect of the present invention is the optical reception device described above, wherein the coefficient update section creates an evaluation function by comparing a signal immediately after being subjected to the compensation by the nonlinear optical compensation section with a training signal which is generated by imparting a carrier phase noise, a frequency offset, and an inverse characteristic of an adaptive equalization filter to a transmission signal transmitted by an optical transmitter, and updates the coefficient so as to minimize the evaluation function.

An aspect of the present invention is a coefficient optimization method including: a nonlinear optical compensation step of performing compensation of wavelength dispersion of a received signal obtained by receiving an optical signal according to a coherent detection method and compensation of a nonlinear optical effect of the received signal N (N is an integer of at least 1) step(s); and a coefficient update step of updating a coefficient so as to optimize the coefficient used in each step in the nonlinear optical compensation step based on a signal having been subjected to the compensation in the nonlinear optical compensation step and a predetermined training signal.

Effects of the Invention

According to the present invention, it becomes possible to perform the compensation of the waveform distortion having high accuracy while limiting the circuit scale.

DESCRIPTION OF EMBODIMENTS

Hereinbelow, embodiments of the present invention will be described with reference to the drawings.

First Embodiment

Figure 1:
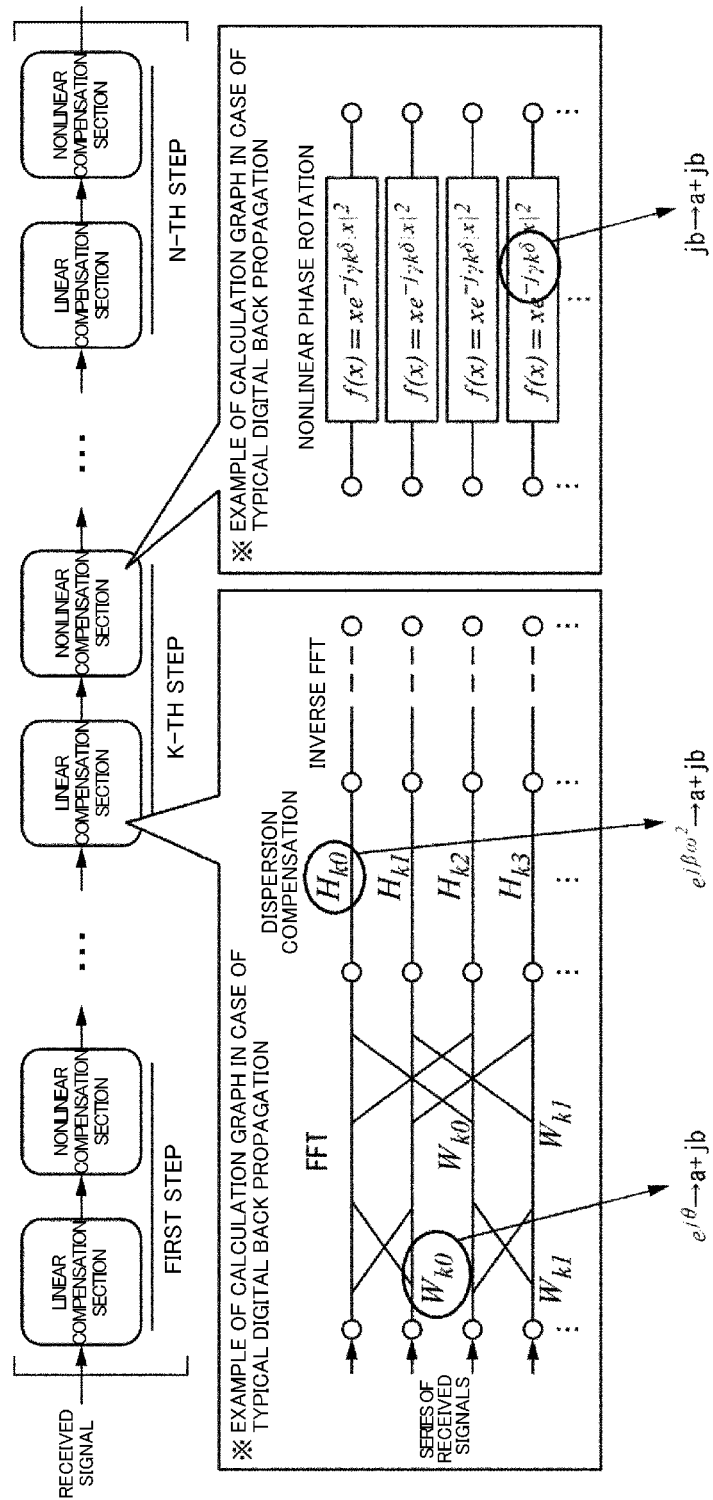
FIG. 1 is a view for explaining the outline of the present invention.

FIG. 1 is a view for explaining the outline of the present invention.

In the present invention, a set of a linear compensation section and a nonlinear compensation section is executed N step(s) in order to perform compensation of a signal similarly to conventional digital back propagation. In the conventional digital back propagation, each of W in FFT/IFFT ($=e^{\hat{}}j\theta$), a dispersion compensation coefficient H ($=e^{\hat{}}j\beta\omega^2$), and a nonlinear phase rotation part ($e^{\hat{}}-j\gamma_k\delta|x|^2$) has a degree of freedom only in a phase direction. Note that each of $j\theta$, $j\beta\omega^2$, and $-j\gamma_k\delta|x|^2$ subsequent to "^" is a superscript of e. In the present invention, while every coefficient in the linear compensation section and the nonlinear compensation section is allowed to have the degree of freedom, the coefficients are optimized in all N steps. Specifically, in the present invention, each of W, the dispersion compensation coefficient H, and the nonlinear phase rotation part is allowed to have the degree of freedom also in a strength direction in addition to the degree of freedom in the phase direction (i.e., is changed to a common complex number a+jb), and optimization of a and b is performed. Note that, in order to simulate an actual physical phenomenon, a term dependent on the strength ($|x|^2$) in the nonlinear phase rotation part is left as it is as is conventionally done.

Hereinbelow, a specific configuration will be described.

Figure 2:
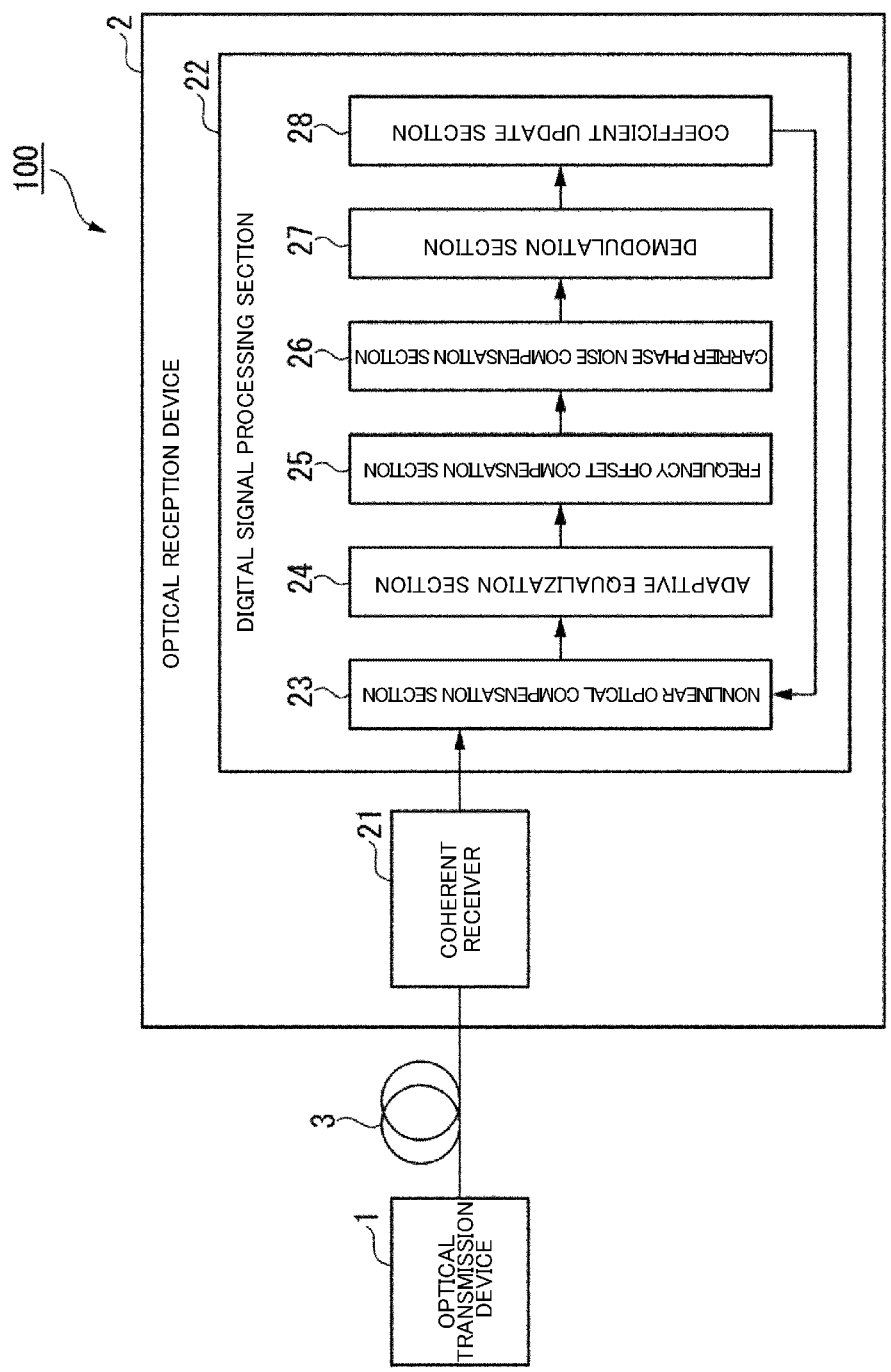
FIG. 2 is a view showing the system configuration of an optical transmission system in a first embodiment.

FIG. 2 is a view showing the system configuration of an optical transmission system 100 in a first embodiment. The optical transmission system 100 includes an optical transmission device 1 and an optical reception device 2. The optical transmission device 1 and the optical reception device 2 are connected to each other so as to be able to communicate with each other via an optical transmission line 3. The optical transmission line 3 transmits an optical signal transmitted by the optical transmission device 1 to the optical reception device 2. The optical transmission line 3 is constituted by an optical fiber which connects the optical transmission device 1 and the optical reception device 2.

The optical transmission device 1 encodes transmission information given from an external information source to generate an electrical signal, converts the generated electrical signal to an optical signal, and transmits the optical signal to the optical reception device 2 via the optical transmission line 3.

The optical reception device 2 includes a coherent receiver 21 and a digital signal processing section 22.

The coherent receiver 21 separates a baseband optical signal into two optical signals of which polarization planes are orthogonal to each other. The optical signals and local light of a local light source (not shown) are input to a 90° hybrid circuit (not shown), and four output lights including a pair of output lights which are caused to interfere with each other in the same phase and opposite phases and a pair of output lights which are caused to interfere with each other orthogonally (90°) and inverse-orthogonally (−90°) are obtained. These output lights are converted to analog signals by a photodiode (not shown). The coherent receiver 11 converts these analog signals to digital signals.

When the optical signal propagates in the optical transmission line 3, a signal waveform is distorted due to a nonlinear optical effect. The digital signal processing section 22 captures the digital signal output by the coherent receiver 21 as a received signal, and performs nonlinear optical compensation on the captured received signal.

The digital signal processing section 22 includes a nonlinear optical compensation section 23, an adaptive equalization section 24, a frequency offset compensation section 25, a carrier phase noise compensation section 26, a demodulation section 27, and a coefficient update section 28. The nonlinear optical compensation section 23 has a configuration shown in FIG. 2, and performs the nonlinear optical compensation on each digital signal.

Figure 3:
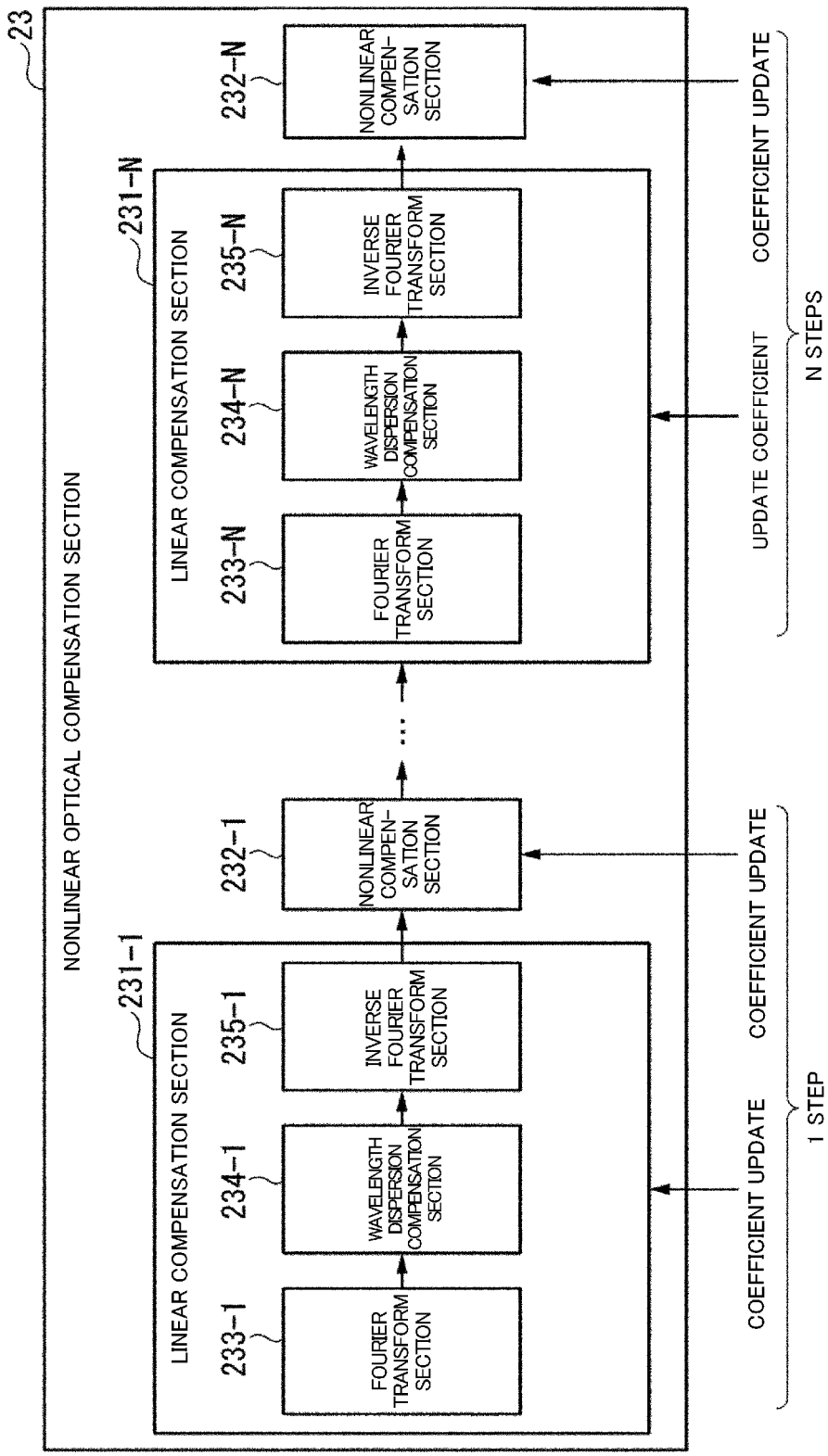
FIG. 3 is a schematic block diagram showing the functional configuration of a nonlinear optical compensation section in the first embodiment.

FIG. 3 is a schematic block diagram showing the functional configuration of the nonlinear optical compensation section 23 in the first embodiment.

The nonlinear optical compensation section 23 includes a plurality of linear compensation sections 231-1 to 231-N and a plurality of nonlinear compensation sections 232-1 to 232-N. One linear compensation section 231 and one nonlinear compensation section 232 constitute one set which performs linear compensation and nonlinear compensation, and the nonlinear optical compensation section 23 includes N sets in order to perform the processing by the set N step(s).

The linear compensation section 231-1 includes a Fourier transform section 233-1, a wavelength dispersion compensation section 234-1, and an inverse Fourier transform section 235-1.

The Fourier transform section 233-1 performs FFT on a received signal in a time domain to thereby transform the received signal in the time domain into a received signal in a frequency domain.

The wavelength dispersion compensation section 234-1 performs wavelength dispersion compensation on the received signal in the frequency domain by using a predetermined coefficient. Specifically, the wavelength dispersion compensation section 234-1 performs the wavelength dispersion compensation by using a coefficient set as an initial value when processing is started, and performs the wavelength dispersion compensation by using an updated coefficient every time the coefficient is updated by the coefficient update section 28.

The inverse Fourier transform section 235-1 performs IFFT on a signal output from the wavelength dispersion compensation section 234-1 to thereby transform the received signal having been subjected to the wavelength dispersion compensation into a received signal in the time domain.

The nonlinear optical compensation section 23 performs the compensation of the nonlinear optical effect on a series of signals output from the inverse Fourier transform section 235 by using a predetermined coefficient. Specifically, the nonlinear optical compensation section 23 performs the compensation of the nonlinear optical effect by using a coefficient set as an initial value when processing is started, and performs the compensation of the nonlinear optical effect by using an updated coefficient every time the coefficient is updated by the coefficient update section 28.

The linear compensation section 231-N performs the same processing as that of the linear compensation section 231-1. In addition, the nonlinear compensation section 232-N performs the same processing as that of the nonlinear compensation section 232-1.

Returning to FIG. 2, the description of the optical reception device 2 will be continued.

The adaptive equalization section 24 is a functional section which compensates for the distortion generated in the waveform of the optical signal in the optical transmission line 3. That is, the adaptive equalization section 24 is a functional section which corrects a code error caused in the optical signal by inter-code interference (intersymbol interference) in the optical transmission line 3. The adaptive equalization section 24 executes adaptive equalization processing with an FIR filter (finite impulse response filter) according to a set tap coefficient.

The frequency offset compensation section 25 executes processing for compensating for a frequency offset on four digital signals on which the adaptive equalization processing has been executed.

The carrier phase noise compensation section 26 executes processing for compensating for a phase offset on the four digital signals of which the frequency offsets have been subjected to the compensation.

The demodulation section 27 performs demodulation and decoding on the four digital signals output from the carrier phase noise compensation section 26 to thereby obtain a demodulation signal.

The coefficient update section 28 updates all coefficients (e.g., W, H, and γ) used in the nonlinear optical compensation section 23 in all steps based on the demodulation signal which is an output signal obtained by the demodulation section 27 and a training signal. The coefficient update section 28 sets the updated coefficients in the individual functional sections of the nonlinear optical compensation section 23. The training signal compared with the demodulation signal which is demodulated as in the present embodiment is a transmission signal (optical signal).

Figure 4:
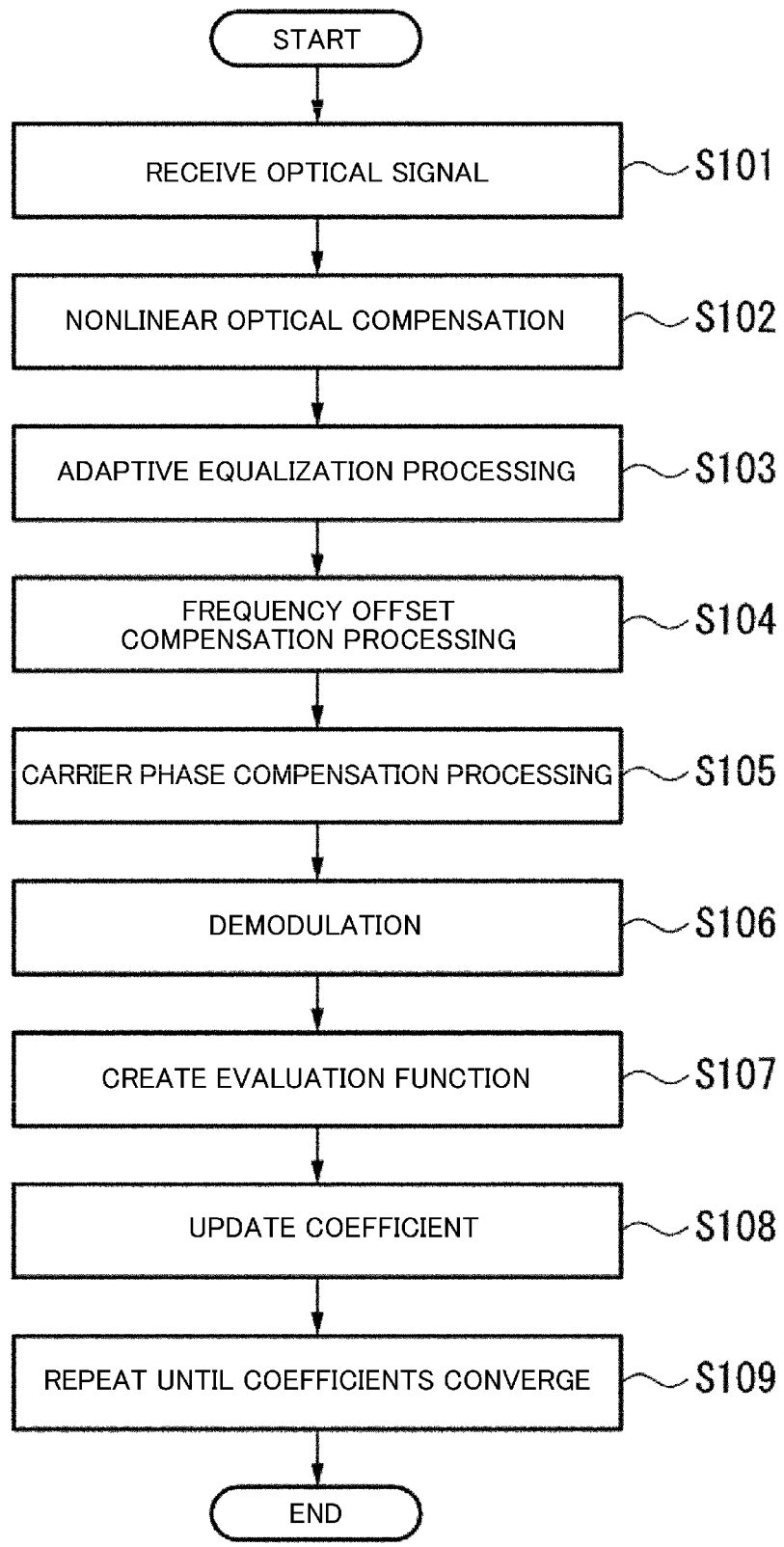
FIG. 4 is a flowchart showing the procedure of coefficient optimization processing performed by an optical reception device in the first embodiment.

FIG. 4 is a flowchart showing the procedure of coefficient optimization processing performed by the optical reception device 2 in the first embodiment. Note that, in FIG. 4, the coefficient optimization processing when the optical transmission system 100 is constructed will be described.

First, an initial setting before the processing in FIG. 4 is started will be described.

Compensation coefficients used in functional sections other than the nonlinear optical compensation section 23 of the digital signal processing section 22 such as, e.g., the adaptive equalization section 24, the frequency offset compensation section 25, and the carrier phase noise compensation section 26 are estimated in advance, and the estimated compensation coefficients are set. Note that, as the method of the estimation, conventional techniques may be used. Next, appropriate initial values are set as all coefficients (e.g., W, H, γ, and the like) used in the nonlinear optical compensation section 23. Note that the initial values of all coefficients used in the nonlinear optical compensation section 23 are any values. Note that, when coefficients used in the conventional digital back propagation are used as the initial values, convergence may be fast. The above description corresponds to the initial setting.

When the initial setting is completed, the coherent receiver 21 of the optical reception device 2 receives the optical signal transmitted from the optical transmission device 1 (Step S101). The coherent receiver 21 converts the received optical signal to the digital signal, and outputs the digital signal to the digital signal processing section 22. The nonlinear optical compensation section 23 performs the nonlinear optical compensation on each digital signal output from the coherent receiver 21 (Step S102). Specifically, the Fourier transform section 233-1 performs the FFT on the received signal in the time domain to thereby transform the received signal in the time domain into the received signal in the frequency domain. At this point, the Fourier transform section 233-1 uses the coefficient W set as the initial value. The Fourier transform section 233-1 outputs the received signal transformed into the received signal in the frequency domain to the wavelength dispersion compensation section 234-1.

The wavelength dispersion compensation section 234-1 performs the wavelength dispersion compensation on the received signal in the frequency domain. At this point, the wavelength dispersion compensation section 234-1 uses the coefficient H set as the initial value. The wavelength dispersion compensation section 234-1 outputs the received signal having been subjected to the wavelength dispersion compensation to the inverse Fourier transform section 235-1. The inverse Fourier transform section 235-1 performs the IFFT on the signal output from the wavelength dispersion compensation section 234-1 to thereby transform the received signal having been subjected to the wavelength dispersion compensation into the received signal in the time domain. The inverse Fourier transform section 235-1 outputs the received signal transformed into the received signal in the time domain to the Fourier transform section 233 in the subsequent stage.

When the processing in Step S102 descried above is executed the number of times corresponding to N steps, the adaptive equalization section 24 executes the adaptive equalization processing for compensating for the distortion generated in the waveform of the output signal output from the nonlinear optical compensation section 23 (Step S103). Note that the method of the adaptive equalization processing is the same as the conventional method, and hence the description thereof will be omitted. The adaptive equalization section 24 outputs the signal having been subjected to the adaptive equalization processing to the frequency offset compensation section 25.

The frequency offset compensation section 25 executes the frequency offset compensation processing for compensating for the frequency offset on the signal output from the adaptive equalization section 24 (Step S104). Note that the method of the frequency offset compensation processing is the same as the conventional method, and hence the description thereof will be omitted. The frequency offset compensation section 25 outputs the signal having been subjected to the frequency offset compensation processing to the carrier phase noise compensation section 26.

The carrier phase noise compensation section 26 executes the carrier phase compensation processing for compensating for the phase offset on the digital signal of which the frequency offset has been subjected to the compensation (Step S105). Note that the method of the carrier phase compensation processing is the same as the conventional method, and hence the description thereof will be omitted. The carrier phase noise compensation section 26 outputs the signal having been subjected to the carrier phase compensation processing to the demodulation section 27.

The demodulation section 27 performs the demodulation and the decoding on the digital signal output from the carrier phase noise compensation section 26 to thereby obtain the demodulation signal (Step S106). The demodulation section 27 outputs the obtained demodulation signal to the coefficient update section 28. The coefficient update section 28 compares the output signal output from the demodulation section 27 with the training signal which is obtained in advance, and creates a predetermined evaluation function (Step S107). As the evaluation function, any evaluation function may be used. For example, as the evaluation function, the residual sum of squares may be used.

Next, the coefficient update section 28 updates all coefficients (e.g., W, H, γ, and the like) used in the nonlinear optical compensation section 23 by using an optimization algorithm so as to minimize the created evaluation function (Step S108). As the optimization algorithm, existing methods which exist in the field of machine learning such as backpropagation and gradient descent may be used. Herein, as an example, the coefficient update section 28 updates all coefficients (e.g., W, H, γ, and the like) used in the nonlinear optical compensation section 23 based on the following Formula (2):

[Math. 2]
$$W(t+1) = W(t) - \mu \frac{\partial E}{\partial W} \quad (2)$$

In Formula (2), W represents a coefficient used in the linear compensation section 231, E represents the evaluation function, and p represents a step size. As shown in Formula (2), differential of the evaluation function E by W is required. Various methods for determining the differential are conceivable, and any method may be used. For example, the differential may be determined by numerical differentiation shown in Formula (3), and may also be determined by the chain rule shown in Formula (4).

[Math. 3]
$$\frac{\partial E}{\partial W} = \frac{E(W+h) - E(W)}{h} \quad (3)$$

[Math. 4]
$$\frac{\partial E}{\partial W} = \frac{\partial E}{\partial z} \cdot \frac{\partial z}{\partial y} \cdot \frac{\partial y}{\partial W} \quad (4)$$

The coefficient update section 28 sets the coefficients obtained by Formula (2) described above in the nonlinear optical compensation section 23. Thereafter, the optical reception device 2 repeatedly executes the processing in Steps S101 to S108 by using the newly set coefficients until the coefficients converge (Step S109).

According to the thus configured optical reception device 2, compensation parameters are provided not only for noise in the phase direction but also for the distortion in the strength direction, and the compensation is performed. Although the number of parameters required for optimization is increased by providing the parameter in the strength direction, it is possible to calculate the optimum parameter in a realizable time period by the backpropagation when the system is constructed. In addition, while the coefficient in each step is fixed in a conventional optical reception device, the coefficients are optimized in all steps in the optical reception device 2. With this, it is possible to perform the nonlinear optical compensation with the shorter number of steps than that required conventionally. Further, even when the number of steps is reduced to be smaller than that required conventionally, it is possible to obtain high compensation light. Accordingly, it becomes possible to perform the compensation of the waveform distortion having high accuracy while limiting the circuit scale.

In addition, the optical reception device 2 allows each of W, the dispersion compensation coefficient H, and the nonlinear phase rotation part to have the degree of freedom in the strength direction in addition to the degree of freedom in the phase direction, and performs the optimization of the parameters in the phase direction and the strength direction. With this, it is possible to prevent deviation from an actual physical phenomenon which occurs at the time of a low step, and it becomes possible to increase the compensation effect.

Further, the optical reception device 2 performs the comparison between the received signal and the training signal after the demodulation. That is, the optical reception device 2 compares the demodulation signal with the training signal. With this, it is possible to use the signal transmitted by the optical transmission device 1 as a correct signal without altering the signal, and it is not necessary to estimate other noises. Accordingly, it is possible to omit useless processing such as estimation of other noises.

Second Embodiment

In the first embodiment, the comparison between the received signal and the training signal is performed after the demodulation. In a second embodiment, the comparison between the received signal and the training signal is performed between the nonlinear optical compensation section 23 and the adaptive equalization section 24.

Figure 5:
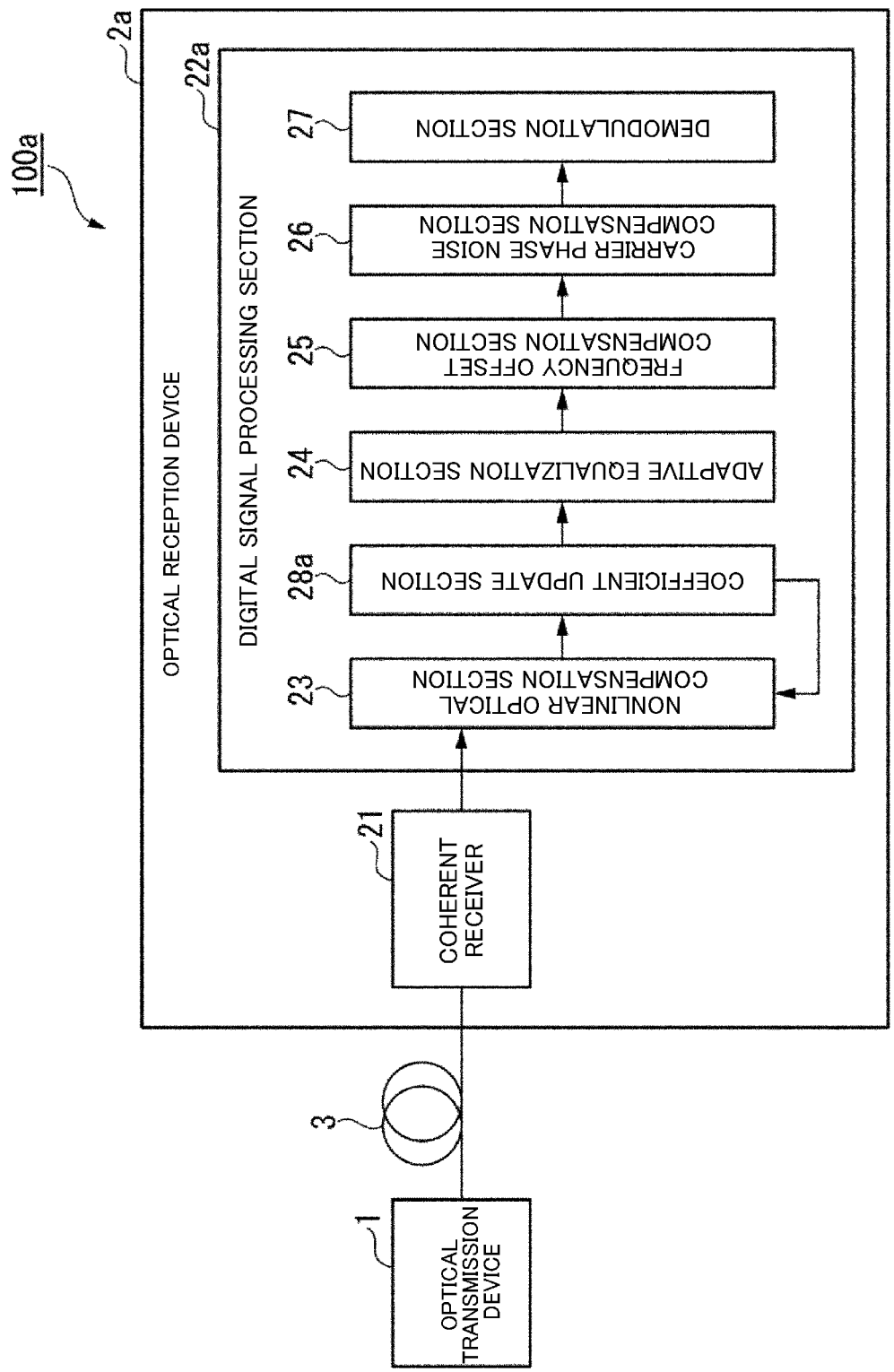
FIG. 5 is a view showing the system configuration of an optical transmission system in a second embodiment.

FIG. 5 is a view showing the system configuration of an optical transmission system 100a in the second embodiment.

The optical transmission system 100a is similar to that in the first embodiment except that the configuration of an optical reception device 2a is different. Hereinbelow, only points of difference will be described.

The optical reception device 2a includes the coherent receiver 21 and a digital signal processing section 22a. The digital signal processing section 22a includes the nonlinear optical compensation section 23, the adaptive equalization section 24, the frequency offset compensation section 25, the carrier phase noise compensation section 26, the demodulation section 27, and a coefficient update section 28a.

In the optical reception device 2a, the coefficient update section 28a is provided between the nonlinear optical compensation section 23 and the adaptive equalization section 24. Thus, the optical reception device 2a updates all coefficients (e.g., W, H, γ, and the like) used in the nonlinear optical compensation section 23 in all steps by using the signal output from the nonlinear optical compensation section 23.

Figure 6:
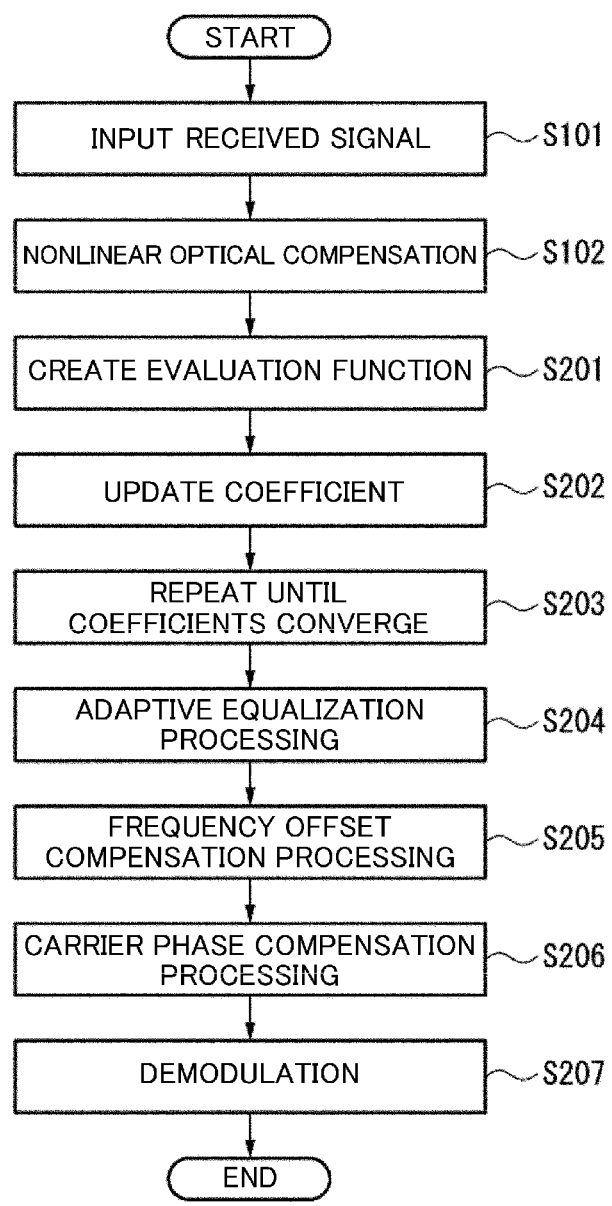
FIG. 6 is a flowchart showing the procedure of signal compensation processing performed by an optical reception device in the second embodiment.
Figure 7:
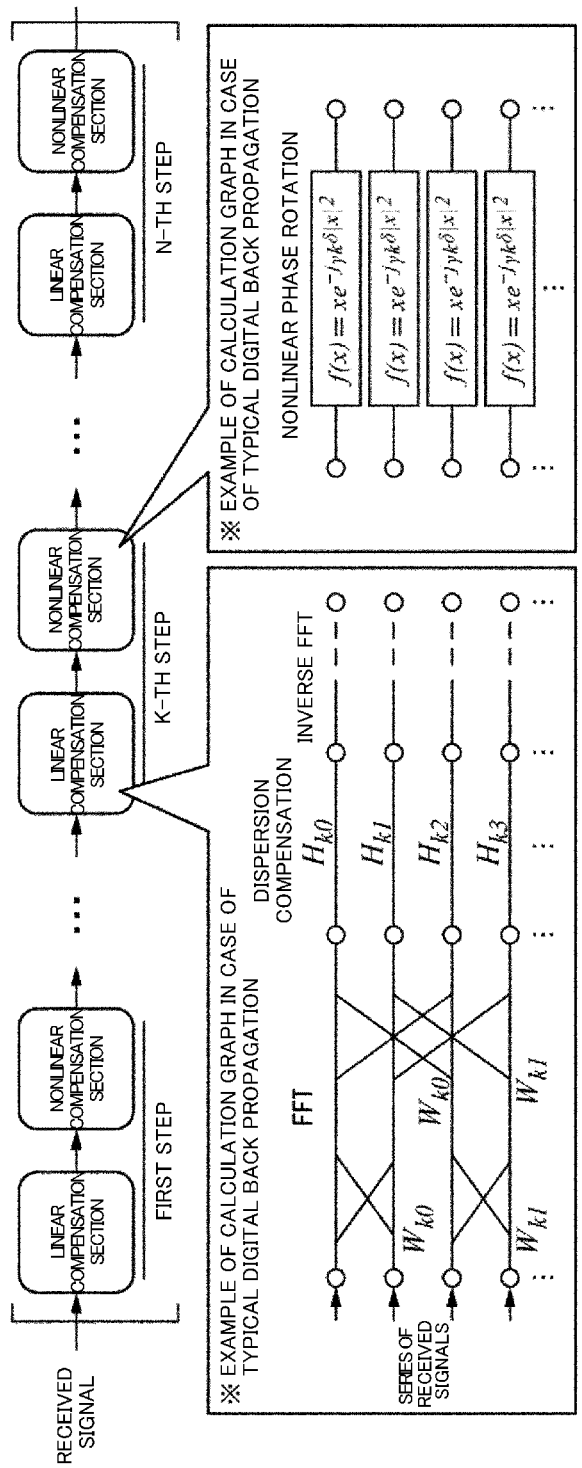
FIG. 7 is a view for explaining conventional digital back propagation.

FIG. 6 is a flowchart showing the procedure of signal compensation processing performed by the optical reception device 2 in the second embodiment. In FIG. 6, the same processing as that in FIG. 4 is designated by the same reference numeral as that in FIG. 4, and the description thereof will be omitted.

When processing in Step S102 is executed the number of times corresponding to N steps, the coefficient update section 28a compares the output signal output from the inverse Fourier transform section 235 with the training signal, and creates a predetermined evaluation function (Step S201). In the second embodiment, unlike the first embodiment, it is not possible to use the transmission signal as the training signal without altering the transmission signal. In this case, the optical reception device 2a needs to create the training signal which is the correct signal having been subjected to the digital back propagation, and it is possible to create the correct signal by imparting the carrier phase noise determined by estimation, the frequency offset, and inverse characteristics of an adaptive equalization filter to the transmission signal sequentially.

Next, the coefficient update section 28a updates all coefficients (e.g., W, H, γ, and the like) used in the nonlinear optical compensation section 23 by using the optimization algorithm so as to minimize the created evaluation function (Step S202). The update of the coefficient using the optimization algorithm is the same as that in the first embodiment. The coefficient update section 28a sets the coefficients obtained by Formula (2) described above in the nonlinear optical compensation section 23. Thereafter, the optical reception device 2a repeatedly executes the processing in Steps S101 to S202 by using the newly set coefficients until the coefficients converge (Step S203).

When the coefficients converge, the coefficient update section 28a outputs the output signal obtained by using the optimized coefficients to the adaptive equalization section 24. The adaptive equalization section 24 performs adaptive equalization which compensates for the distortion generated in the waveform of the output signal output from the coefficient update section 28a (Step S204). The adaptive equalization section 24 outputs the signal having been subjected to the adaptive equalization processing to the frequency offset compensation section 25.

The frequency offset compensation section 25 executes the frequency offset compensation processing for compensating for the frequency offset on the signal output from the adaptive equalization section 24 (Step S205). The frequency offset compensation section 25 outputs the signal having been subjected to the frequency offset compensation processing to the carrier phase noise compensation section 26. The carrier phase noise compensation section 26 executes the carrier phase compensation processing for compensating for the phase offset on the digital signal of which the frequency offset has been subjected to the compensation (Step S206). The carrier phase noise compensation section 26 outputs the signal having been subjected to the carrier phase compensation processing to the demodulation section 27. The demodulation section 27 performs the demodulation and the decoding on the digital signal output from the carrier phase noise compensation section 26 to thereby obtain the demodulation signal (Step S207). The demodulation section 27 outputs the obtained demodulation signal to the subsequent stage.

According to the thus configured optical reception device 2a, similarly to the first embodiment, even when the number of steps is reduced to be smaller than that required conventionally, it is possible to obtain high compensation light. Accordingly, it becomes possible to perform the compensation of the waveform distortion having high accuracy while limiting the circuit scale.

In addition, the optical reception device 2a performs the comparison between the received signal and the training signal immediately after the digital back propagation. With this, a feedback loop for update is small and it is possible to make the speed of learning higher than that in the first embodiment.

Modification Common to First Embodiment and Second Embodiment

The coefficient update section 28 or 28a may perform the comparison between the received signal and the training signal at another location. Specifically, the optical reception device 2 or 2a may perform the comparison between the received signal and the training signal between the adaptive equalization section 24 and the frequency offset compensation section 25, between the frequency offset compensation section 25 and the carrier phase noise compensation section 26, or between the carrier phase noise compensation section 26 and the demodulation section 27.

While each embodiment has described the configuration in which the optimization of the parameter is performed when the system is constructed, the optical reception device 2 or 2a may also be configured so as to perform the optimization of the parameter during the actual operation of the system. In the case where the optical reception device 2 or 2a is configured in the above manner, it is conceivable to use a method in which the optical reception device 2 or 2a perform coefficient update on a reception side by using a pilot signal as the correct signal in which the known pilot signal is mixed into a series of transmission signals between the optical transmission device 1 and the optical reception device 2 or 2a.

With this, it becomes possible to maintain or improve compensation accuracy during the operation.

Each of the optical reception devices 2 and 2a described above may be implemented by a computer. In this case, each of the optical reception devices 2 and 2a may be implemented by recording a program for implementing the function in a computer-readable recording medium, causing a computer system to read the program recorded in the recording medium, and executing the program. "The computer system" mentioned herein is assumed to include an OS and hardware such as peripheral equipment. In addition, "the computer-readable recording medium" denotes a portable medium such as a flexible disk, a magneto-optical disk, a ROM, or a CD-ROM, or a storage device such as a hard disk included in a computer system. Further, "the computer-readable recording medium" may include a medium which dynamically retains a program for a short period of time such as a communication line in the case where the program is transmitted via a network such as the Internet or a telecommunication line such as a phone line, and a medium which retains the program for a predetermined period of time such as a volatile memory in a server or a computer system serving as a client in the above case. In addition, the program mentioned above may be a program for implementing part of the above-described function, a program which can implement the above-described function in combination with a program which is already recorded in a computer system, or a program which is implemented by using a programmable logic device such as an FPGA (Field Programmable Gate Array).

Although the embodiments of the present invention have been described in detail with reference to the drawings, its specific configuration is not limited to the embodiments, and design within a scope which does not depart from the gist of the present invention is included in the claims.

REFERENCE SIGNS LIST

1 Optical transmission device
2,2a Optical reception device
21 Coherent receiver
22,22a Digital signal processing section
23 Nonlinear optical compensation section
24 Adaptive equalization section
25 Frequency offset compensation section
26 Carrier phase noise compensation section
27 Demodulation section
28,28a Coefficient update section
231-1 to 231-N Linear compensation section
232-1 to 232-N Nonlinear compensation section
233-1 to 233-N Fourier transform section
234-1 to 234-N Wavelength dispersion compensation section
235-1 to 235-N Inverse Fourier transform section

The invention claimed is:

1. An optical reception device comprising:
a coherent receiver configured to receive an optical signal from an optical transmission device and convert the received optical signal to a digital signal;
a nonlinear optical compensation section configured to:
  receive the digital signal from the coherent receiver; and
  perform compensation of wavelength dispersion of the received digital signal and compensation of a nonlinear optical effect of the received digital signal N (N is an integer of at least 1) step(s) using a plurality of initial coefficients so as to output an output signal; and
a coefficient update section configured to:
  compare between the output signal and a training signal to provide a comparison result, the training signal being either:
    a transmission signal corresponding to the optical signal transmitted by the optical transmission device; or
    a modified transmission signal generated by imparting a carrier phase noise, a frequency offset, and an inverse characteristic of an adaptive equalization filter to the transmission signal transmitted by the optical transmission device;
  create an evaluation function based on the comparison result; and
  update and optimize the plurality of initial coefficients to generate a plurality of updated coefficients in each of the N step(s) of the nonlinear optical compensation section based on the evaluation function.

2. The optical reception device according to claim 1, wherein each coefficient of the plurality of initial coefficients and the plurality of updated coefficients used in each of the N step(s) of the nonlinear optical compensation section has a degree of freedom in each of a phase direction and a strength direction, and
the plurality of updated coefficients are optimized in the phase direction and the strength direction.

3. The optical reception device according to claim 2, wherein each of the N step(s) of the nonlinear optical compensation section includes:
  a Fourier transform section which transforms the received digital signal in a time domain into a first signal in a frequency domain;
  a wavelength dispersion compensation section which performs wavelength dispersion compensation of the first signal in the frequency domain to generate a wavelength dispersion compensation signal;
  an inverse Fourier transform section which transforms the wavelength dispersion compensation signal into a second signal in the time domain; and
  a nonlinear compensation section which performs the compensation of the nonlinear optical effect of the second signal in the time domain, and
  a respective corresponding coefficient of the plurality of initial coefficients and the plurality of updated coefficients is used in the Fourier transform section or the inverse Fourier transform section, used in the wavelength dispersion compensation section, and used in the nonlinear compensation section.

4. The optical reception device according to claim 1, further comprising a demodulation section which demodulates the output signal to generate a demodulation signal, wherein the coefficient update section is configured to:

create the evaluation function by comparing the demodulation signal with the transmission signal which is transmitted as the training signal by the optical transmission device; and minimize the evaluation function by using an optimization algorithm to generate the plurality of updated coefficients.

5. The optical reception device according to claim 1, wherein the coefficient update section is configured to:

create the evaluation function by comparing the output signal from the nonlinear optical compensation section with the training signal which is generated by imparting the carrier phase noise, the frequency offset, and the inverse characteristic of the adaptive equalization filter to the transmission signal transmitted by the optical transmission device; and minimize the evaluation function by using an optimization algorithm to generate the plurality of updated coefficients.

6. A coefficient optimization method comprising:
an optical signal reception step of:
receiving an optical signal from an optical transmission device; and
converting the received optical signal to a digital signal;

a nonlinear optical compensation step of:
receiving the digital signal; and
performing compensation of wavelength dispersion of the received digital signal and compensation of a nonlinear optical effect of the received digital signal N (N is an integer of at least 1) step(s) using a plurality of initial coefficients so as to output an output signal; and a coefficient update step of:
comparing between the output signal and a training signal to provide a comparison result, the training signal being either:
a transmission signal corresponding to the optical signal transmitted by the optical transmission device; or
a modified transmission signal generated by imparting a carrier phase noise, a frequency offset, and an inverse characteristic of an adaptive equalization filter to the transmission signal transmitted by the optical transmission device,
creating an evaluation function based on the comparison result; and
updating an optimizing the plurality of initial coefficients to generate a plurality of updated coefficients used in each of the N step(s) of the nonlinear optical compensation step based on the evaluation function.

7. The coefficient optimization method according to claim 6,
wherein each coefficient of the plurality of initial coefficients and the plurality of updated coefficients used in each of the N step(s) of the nonlinear optical compensation step has a degree of freedom in each of a phase direction and a strength direction, and
the plurality of updated coefficients are optimized in the phase direction and the strength direction.

8. The coefficient optimization method according to claim 7,
wherein each of the N step(s) of the nonlinear optical compensation step includes:
a Fourier transform step of transforming the received digital signal in a time domain into a first signal in a frequency domain;
a wavelength dispersion compensation step of performing wavelength dispersion compensation of the first signal in the frequency domain to generate a wavelength dispersion compensation signal;
an inverse Fourier transform step of transforming the wavelength dispersion compensation signal into a second signal in the time domain; and
a nonlinear compensation step of performing the compensation of the nonlinear optical effect of the second signal in the time domain, and
a respective corresponding coefficient of the plurality of initial coefficients and the plurality of updated coefficients is used in the Fourier transform step or the inverse Fourier transform step, used in the wavelength dispersion compensation step, and used in the nonlinear compensation step.

9. The coefficient optimization method according to claim 6, further comprising:
a demodulation step of demodulating the output signal to generate a demodulation signal,
wherein the coefficient update step is configured with:
creating the evaluation function by comparing the demodulation signal with the transmission signal which is transmitted as the training signal by the optical transmission device; and
minimizing the evaluation function by using an optimization algorithm to generate the plurality of updated coefficients.

10. The coefficient optimization method according to claim 6
wherein the coefficient update step is configured with:
creating the evaluation function by comparing the output signal from the nonlinear optical compensation step with the training signal which is generated by imparting the carrier phase noise, the frequency offset, and the inverse characteristic of the adaptive equalization filter to the transmission signal transmitted by the optical transmission device; and
minimizing the evaluation function by using an optimization algorithm to generate the plurality of updated coefficients.

* * * * *